United States Patent [19]

Robbins

[11] 4,430,020
[45] Feb. 7, 1984

[54] DRIP IRRIGATION HOSE

[76] Inventor: Jackie W. D. Robbins, Rte. 3, Box 329A, Ruston, La. 71270

[21] Appl. No.: 428,361

[22] Filed: Sep. 29, 1982

[51] Int. Cl.³ .................... E02B 13/00; B05B 1/20
[52] U.S. Cl. .................................... 405/43; 138/170; 138/177; 239/542; 405/36; 405/45
[58] Field of Search ................................ 405/36–49; 239/542, 547, 553.1, 533, 145, 543, 545; 138/177, 172, 170, 145

[56] References Cited

U.S. PATENT DOCUMENTS

| | | | |
|---|---|---|---|
| 2,380,427 | 7/1945 | Gilfillan | 138/170 |
| 3,528,251 | 9/1970 | Falk | 405/43 X |
| 3,896,999 | 7/1975 | Barragan | 239/542 X |
| 3,917,169 | 11/1975 | Harmony | 239/542 X |
| 4,022,248 | 5/1977 | Hepner et al. | 138/170 X |
| 4,033,474 | 7/1977 | Rentmeester | 138/170 X |
| 4,047,995 | 9/1977 | Leal-Diaz | 405/36 X |

*Primary Examiner*—Dennis L. Taylor
*Attorney, Agent, or Firm*—John M. Harrison

[57] ABSTRACT

A drip irrigation hose which is characterized by a tubular hose member having a major or primary channel or conduit and a secondary regulatory conduit or channel plate laminated between the lapped edge portions of the major channel with one edge of the secondary conduit plate communicating with the interior of the primary conduit and the liquid supply therein, and the opposite edge of the secondary conduit plate communicating with the surrounding. The secondary conduit plate can be shaped from an elongated strip of resilient film or sheeting and includes interior fluid flow paths in a sequenced, repetitive configuration which communicate with the high pressure liquid supply in the major or primary channel and with discharge openings provided in spaced relationship in the secondary conduit plate. The regulatory secondary conduit plate can be constructed by inscribing a desired pattern in an elongated strip of resilient film or sheeting and separating and/or orienting the inscribed conduit plate for insertion between the lapped edges of the primary channel film according to the teaching of the invention. In a preferred embodiment the paths through the secondary conduit plate are tortuous in configuration and serve to channel the water in turbulent flow and reduce the pressure of the liquid to a desired level at the discharge points. In another preferred embodiment of the invention the paths are shaped to define a vortex to reduce the pressure and to cause the water to drip or trickle from discharge apertures at a regulated flow rate.

14 Claims, 7 Drawing Figures

DRIP IRRIGATION HOSE

BACKGROUND OF THE INVENTION

1. Field of the Invention

This invention relates to drip or trickle irrigation, and more particularly, to a new and improved drip irrigation hose which includes a primary channel or conduit for receiving a supply of liquid, and a secondary, regulatory conduit characterized by a strip or plate of material provided between the lapped edges of the primary conduit and having multiple fluid flow paths inscribed in the plate and extending in a repetitive pattern from the high pressure interior of the primary conduit through paths formed by adjacent segments of the plate, and exiting to the surroundings at the low pressure discharge side of the plate. In a preferred embodiment, each flow path in the regulatory secondary conduit is small and zigzag in nature and serves to reduce the water or liquid pressure from the interior of the primary conduit to the point of discharge of the liquid from the regulatory secondary conduit to the atmosphere.

A primary problem which must be solved in the design of a drip or trickle irrigation hose is the provision of a regulated, uniform drip or trickle discharge from a supply conduit containing irrigation liquid under pressure. The problem becomes more acute as the pressure in the supply conduit varys along the length of the conduit. The problem cannot be adequately solved merely by providing a simple series of spaced apertures in the supply conduit, since in general, the fluid pressure at the point of entry of the liquid into the supply conduit is higher than the pressure in the conduit farthest away from the point of entry. This decreasing pressure along the length of the conduit resulting from discharge of water or liquid through the spaced apertures and the pressure drop due to friction normally associated with liquid flow through the conduit, tends to result in a larger rate of discharge of water or fluid from apertures near the point of entry of the water into the conduit and a lesser discharge rate from apertures at the opposite end of the conduit.

2. Description of the Prior Art

Various emitter systems have been proposed by those skilled in the art to effect a uniform rate of fluid or liquid discharge along the length of the drip irrigation hose. Some hoses utilize very small apertures in the wall of the supply conduit in order to achieve the desired flow rate from the conduit. However, this system suffers from the disadvantage of requiring the use of a relatively high pressure fluid source and a high discharge rate. Also, since the apertures are so small, sand and other materials in the irrigating liquid easily easily block them Additionally, use of only short lengths of the drip irrigation hose are possible before the variation in pressure (and, therefore discharge rate) between apertures is too great. Other hose designs allowing the use of larger apertures which are less subject to clogging and permitting longer lengths of run while still providing a uniform discharge flow of satisfactory proportions have taken the form of providing emitters with a complex of orifices and long path tortuous and non-tortuous passages from the point of high pressure to the point of discharge.

These more complex designs require precise and relatively small discharge apertures. Those using relatively long flow paths to reduce the pressure at the emitter discharge frequently provides laminar flow of liquids or fluids through these paths, with a resulting high tendancy to clogging and high sensitivity to pressure variation in the primary conduit or supply chamber. Thus, more complex, tortuous paths are sometimes used to provide a method of facilitating turbulent flow of liquid from the high pressure zone to the point of discharge, thereby allowing a relatively large flow path and reducing the sensitivity of the discharge flow to primary conduit water pressure fluctuations.

Among the attempts to solve the problem of providing a satisfactory drip or trickle irrigation hose is the drip level irrigation apparatus disclosed in U.S. Pat. No. 4,215,822, to R. Mehoudar. This patent defines an emitter unit having a wall characterized by an elongated flow path; an inlet and outlet for the unit; a connector for coupling the unit to an irrigation conduit; and two sets of oppositely-directed members projecting into the flow path to provide a tortuous path for reducing the pressure of the liquid fluid flowing through the flow path. Another patent disclosing a "One-Piece Drip Irrigation Device", is U.S. Pat. No. 3,873,030, to J. S. Barragan, which teaches the use of an irrigation device for attachment to the perforated wall of an irrigation liquid supply pipe, the device including a casing having side and bottom walls and a flange extending outwardly from the edges of an open casing wall. The flange further includes an enclosed housing with multiple, alternate walls which form a passage provided with multiple obstacles to the liquid, and including in one end, a perforation for liquid exit at a reduced pressure. Similiar devices are disclosed in U.S. Pat. No. 3,896,999 and 3,870,236, to J. S. Barragan. U.S. Pat. No. 3,753,527 to L. D. Galbraith, et al, also discloses multiple drip units or irrigators which are attached to a plastic hose, each irrigator having a relatively large metering orifice and a vortex chamber upstream of the metering orifice and designed to swirl the water ahead of the orifice giving the orifice the flow-determining characteristics of a relatively small orifice. The vortex chamber also serves to increase the velocity of the water at the orifice, providing a scouring action at the orifice which works to prevent algae build-up. Other patents designed to achieve a desirable pressure drop between the high pressure supply water and the emitter discharge are U.S. Pat. No. 3,667,685 to Isaac Rinkewich, U.S. Pat. No. 28,095, to R. D. Chaplin and U.S. Pat. No. 4,022,384 to W. I. Hoyle, et al.

One of the problems associated with conventional drip irrigation hose design is the difficulty of manufacturing a uniform product. The requirement to form a precise, complex design frequently leads to a high expense of manufacture, resulting in a high cost to the user.

Accordingly, it is an object of this invention to provide a drip irrigation hose having both a primary and a secondary flow chamber which promote a multiple emitter discharge trickle or drip which is relatively insensitive to pressure variations in the primary feed water stream.

Another object of this invention is to provide a drip irrigation hose which is characterized by a primary channel or chamber for receiving a supply of water or liquid and a secondary, regulatory conduit shaped from a length of material fitted to the primary chamber and characterized by a repetitive pattern of inlet openings from the primary chamber flow paths and discharge orifices or apertures, which flow paths are sized and shaped to facilitate regulated, uniform drip flow of the pressurized liquid inside the primary chamber through the regulatory conduit to the point of discharge.

Another object of the invention is to provide a drip irrigation hose, the primary conduit of which is shaped from a length of film or sheet of resilient material which is lapped at the edges, and a secondary, regulatory conduit characterized by a plate of resilient material coextensive with the primary conduit and having a repetitive flow path pattern therein, and positioned between the lapped edges of the primary conduit with entry ports in spaced relationship along one edge of the secondary conduit or in the lapped edge of the primary conduit and projecting inside the primary conduit and discharge ports or apertures provided in spaced relationship along the opposite edge of the secondary conduit or in the lapped edge of the primary conduit and projecting outside of the primary conduit to direct the flow of liquid from the primary conduit, through the secondary conduit in regulated drip or trickle flow, uniformly along the length of the hose.

Still another object of the invention is to provide a new and improved drip irrigation hose which is characterized by a primary conduit shaped from a length of resilient sheeting having lapped edges to exhibit an essentially round cross section when in use; a regulatory, secondary conduit formed from an elongated, resilient strip or plate of selected thickness laminated between the lapped edges of the primary conduit film and running essentially the entire length of the primary conduit; and a flow path pattern of desired length and configuration included in the secondary conduit to provide a path for the flow of liquid or fluid from the high pressure primary conduit to a low pressure emission point from the secondary conduit, the secondary conduit plate flow paths preferably formed by stamping, cutting or otherwise inscribing the desired flow path pattern into the secondary conduit strip, separating and orienting the segments and securing the segments between the lapped edges of the primary conduit.

SUMMARY OF THE INVENTION

These and other objects of the invention are provided in a drip irrigation hose which includes a primary conduit shaped from a length of resilient sheet material having the edges lapped to define a generally circular or elliptical cross section, and a secondary or regulatory conduit characterized by an elongated strip or plate of material extending essentially the entire length of the primary conduit and laminated between the lapped edges of the primary conduit and further including repetitive paths of selected length and shape in the plate, and communicating with multiple openings into the primary conduit, and multiple discharge openings communicating with the outside surroundings, wherein liquid at high pressure can be introduced into the primary conduit and will flow into the inlet openings and through the paths of the secondary conduit plate to discharge at a lower pressure through the discharge openings.

BRIEF DESCRIPTION OF THE DRAWING

The invention will be better understood by reference to the accompanying drawings, wherein.

DESCRIPTION OF THE PREFERRED EMBODIMENT

Figure 1:
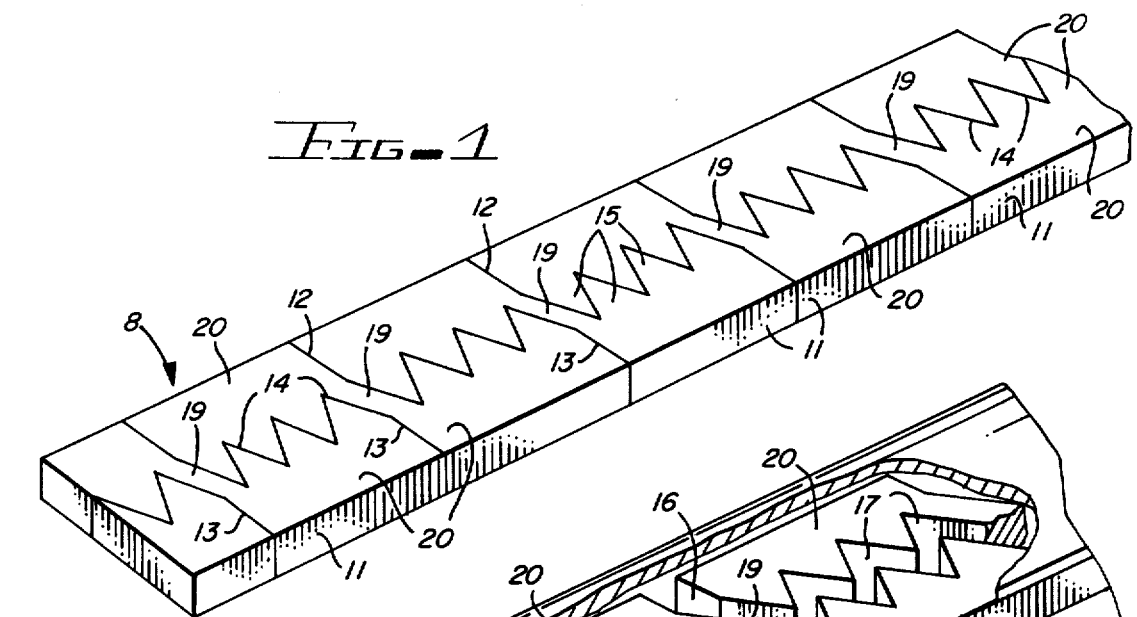
FIG. 1 is a perspective view of a preferred regulatory, secondary conduit plate element of the drip irrigation hose of this invention.

Referring to FIG. 1 of the drawings, a key element in the drip irrigation hose of this invention is the flow-regulating secondary conduit plate, generally illustrated by reference numeral 8, which is shaped from a sheet of resilient film material into an elongated, generally rectangular plate of selected thickness, as illustrated. A flow path pattern is provided in the secondary conduit plate 8 by inscribing multiple inlet cuts 12, discharge cuts 13, and baffle cuts 14, all joining.

Figure 2:
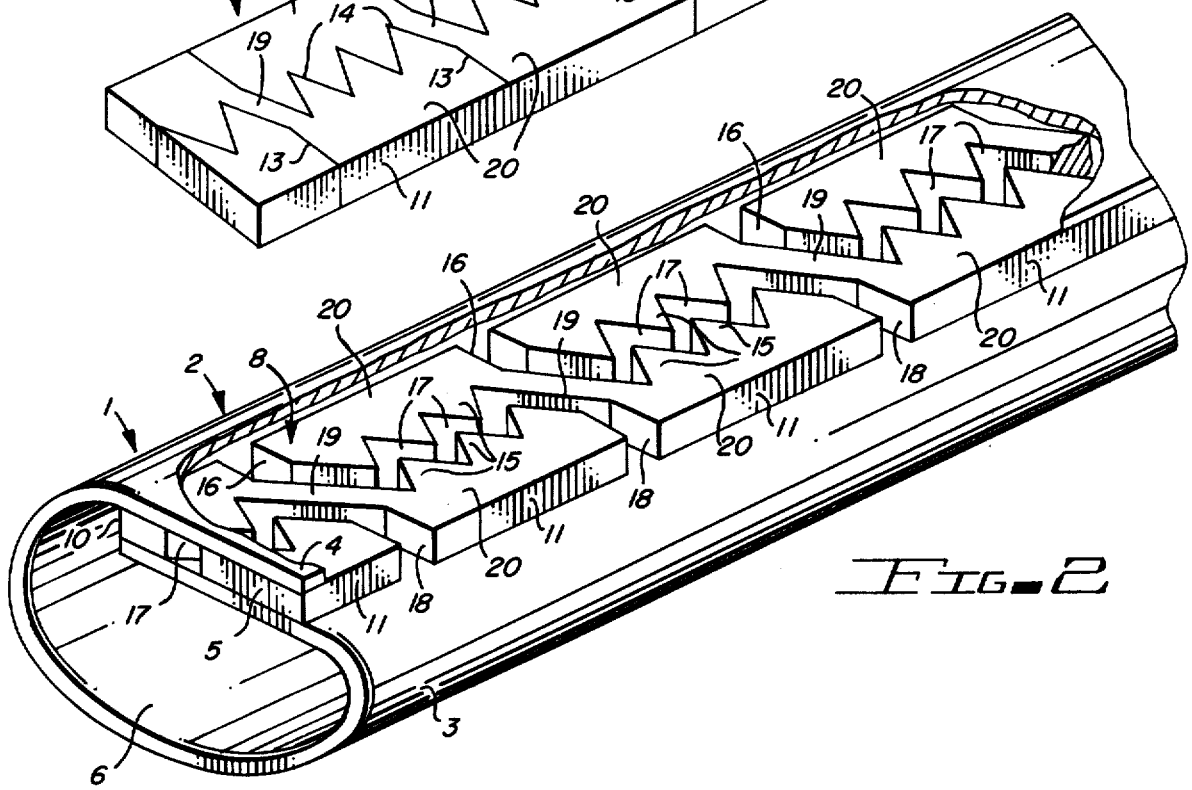
FIG. 2 is a perspective view, partially in section, of a segment of the drip irrigation hose in a preferred embodiment.

Referring now to FIG. 2 of the drawings, when the inlet cuts 12, discharge cuts 13 and baffle cuts 14 are inscribed as illustrated in FIG. 1, and certain opposed ones of plate segments 20 are separated by stretching each of the plate necks 19 joining certain ones of the plate segments 20, the inlet cuts 12 define inlet flow paths 16, discharge cuts 13 define discharge flow paths 18 and the baffle cuts 14 define multiple baffles 15 and baffle flow paths 17. Furthermore, in a most preferred embodiment the secondary conduit plate 8 is sandwiched or laminated between the top film edge 4 and the bottom film edge 5 of the primary conduit 2, which is shaped from an elongated sheet of film 3. Accordingly, since the top film edge 4 covers the top portion of the secondary conduit plate 8, and the bottom film edge 5 closes the bottom area of the secondary conduit plate 8, the inlet flow paths 16, baffle flow paths 17 and discharge flow paths 18 become closed conduits for the passage of water from the high pressure environment inside conduit interior 6 to the low pressure water discharge through the respective discharge flow paths 18. As further illustrated in FIG. 2, the liquid must flow in the drip irrigation hose 1 through primary conduit 2 from conduit interior 6 through the multiple inlet flow paths 16 in inside plate edge 10, through the baffle flow paths 17 and around baffles 15, and finally through the discharge flow paths 18 terminating at the outside plate edge 11. Since the water or liquid is made to flow from a region of high pressure inside the conduit interior 6 and through the tortuous baffle flow paths 17, it exits the discharge flow paths 18 at a much lower pressure, and yet turbulent flow conditions are encouraged in inlet flow paths 16, baffle flow paths 17 and discharge flow paths 18, in order to minimize the effect of pressure fluctuations in conduit interior 6 and in order to allow a large decrease in pressure through the flow regulating secondary conduit 8.

Figure 3:
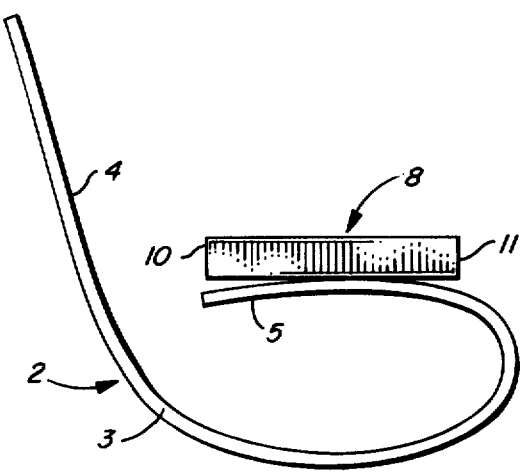
FIG. 3 is an end elevation of the primary conduit film and a cooperating secondary conduit plate, illustrating a preferred method of making the drip irrigation hose.
Figure 4:
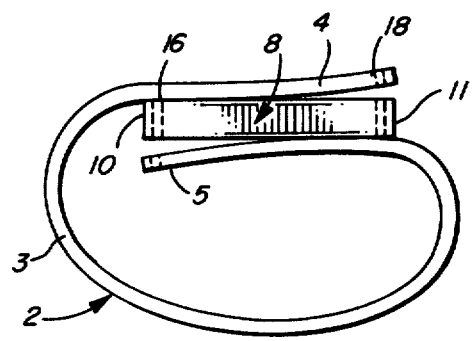
FIG. 4 is an end elevation of the secondary conduit plate in laminated position between the top and bottom film edges of the primary conduit film.

As illustrated in FIGS. 3 and 4, a preferred technique of constructing the drip irrigation hose 1 is by initially providing a secondary conduit plate 8 having a desired pattern of inlet cuts 12, discharge cuts 13 and baffle cuts 14 which define a repetitive flow path for the water after the system is assembled. When the secondary conduit plate 8 is completed by stamping or otherwise inscribing inlet cuts 12, discharge cuts 13 and baffle cuts 14, the plate segments 20 are oriented to define inlet flow paths 16, baffle flow paths 17 and discharge flow paths 18, the length of film 3 is positioned with the bottom film edge 5 beneath the secondary conduit plate 8 as illustrated in FIG. 3, and the top film edge 4 is then lapped over the top of the secondary conduit plate 8 as illustrated in FIG. 4. The top film edge 4 and bottom film edge 5 are then laminated by glueing, heat sealing or using another suitable bonding technique to secure the top film edge 4 and bottom film edge 5 to the secondary conduit plate 8 in order to provide top and bottom walls for the inlet flow paths 16, baffle flow paths 17 and discharge flow paths 18, as described with respect to FIG. 2 of the drawings.

Figure 5:
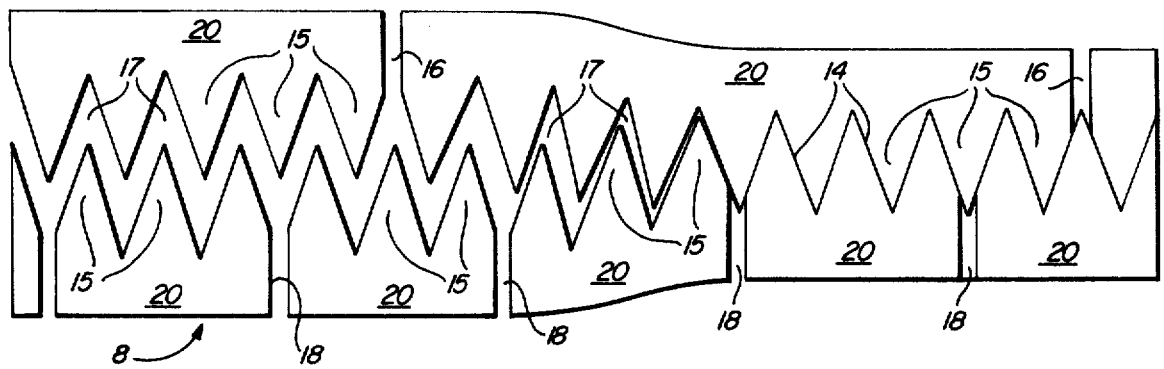
FIG. 5 is a top elevation of a section of the secondary conduit plate in another embodiment, more particularly illustrating a preferred technique of shaping or forming the secondary conduit plate.

Referring now to FIG. 5 of the drawings, in yet another preferred embodiment of the invention, respective flow paths for the secondary conduit plate 8 are initially inscribed or stamped as illustrated in FIG. 1, but with the inlet flow paths 16 and discharge flow paths 18 defined by removing plugs of material from the secondary conduit plate 8 or drilling or otherwise providing holes in the inside plate edge 10 and outside plate edge 11 in spaced relationship, respectively. In this manner, separation of the respective plate segments 20 facilitates multiple inlet flow paths 16 and discharge flow paths 18 without the necessity of longitudinal displacement of the plate segments 20 with respect to each other. Accordingly, the oppositely-disposed plate segments 20 can be displaced from each other a selected distance to create baffle flow paths 17 of selected width, and the top film edge 4 and bottom film edge 5 of a length of film 3 are then attached as illustrated in FIGS. 3 and 4, to create a drip irrigation hose 1 having desired flow characteristics.

In another preferred embodiment flow paths in the secondary conduit plate 8 are initially inscribed as illustrated in FIG. 5, except that cuts for inlet flow paths 16 and discharge flow paths 18 are omitted. Instead, inlet flow paths 16 are openings drilled, punched or otherwise provided in bottom film edge 5 communicating with the baffle flow paths 17, and discharge flow paths 18 are additional openings provided in top film edge 4 also communicating with the baffle flow paths 17, as illustrated in FIG. 4.

Figure 6:
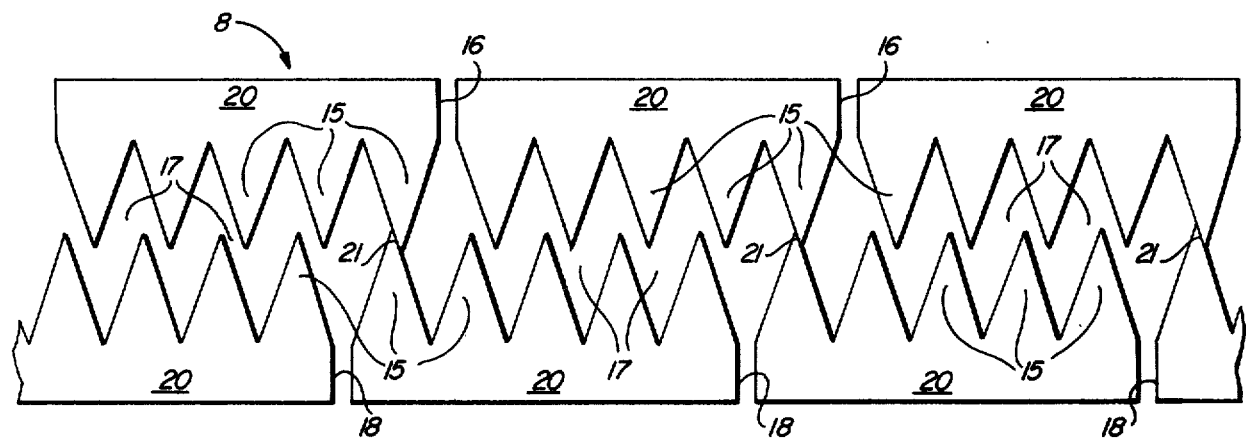
FIG. 6 is yet another preferred secondary conduit plate for use with the drip irrigation hose.

Referring now to FIG. 6 of the drawings, in yet another preferred embodiment of the invention, a secondary conduit plate 8 is shaped by initially creating the inlet cuts 12, discharge cuts 13 and baffle cuts 14, as described with respect to FIGS. 1 and 5. The oppositely-disposed plate segments 20 are then moved away from each other to a predetermined extent in order to define a series of baffle flow paths 17 of selected size, and longitudinal displacement of adjacent plate segments 20, forming a common side of secondary conduit 8, is effected, to cause certain baffles 15 to contact each other at flow seals 21. The flow seals 21 serve to facilitate liquid flow through the inlet flow paths 16 and the baffle flow paths 17, and to exit through the discharge flow paths 18 in discrete flow path sequences, and to prevent mixing of the respective liquid streams between the baffle flow paths 17.

By selecting a specific size and number of baffles 15, and determining the size of the inlet flow paths 16, baffle flow paths 17 and discharge flow paths 18 in a secondary conduit plate 8 of desired thickness, a desired flow regulation from the high pressure conduit interior 6 to the discharge flow paths 18 can be facilitated.

Although the tortuous baffle flow paths 17 are preferred, it will be appreciated that straight or even curved flow paths can be provided, with laminar turbulent or transitional flow of liquid, as deemed desirable.

Figure 7:
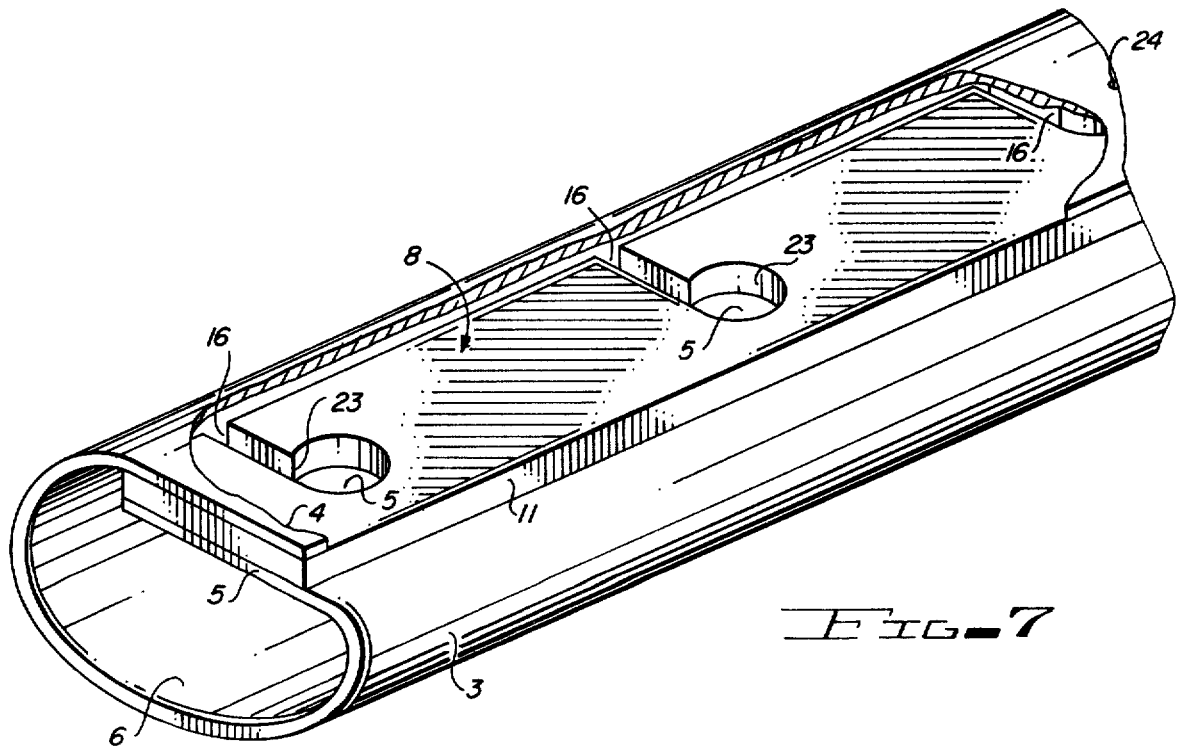
FIG. 7 is another preferred embodiment of the drip irrigation hose which utilizes multiple vortices to achieve the desired pressure drop and flow regulation.

Referring now to FIG. 7 of the drawing, in a still further preferred embodiment of the invention the secondary conduit plate 8 is provided with multiple vortices 23, which are positioned in spaced relationship along the entire length of the secondary conduit plate 8. The vortices 23 serve to channel the liquid entering the secondary conduit plate 8 through the respective inlet flow paths 16 in a "swirling", whirlpool action. This design causes the liquid to exit vortex discharges 24, located in the top film edge 4 of film 3 and positioned above the center of the respective vortices 23, in order to provide the desired trickle or drip flow from the vortex discharges 24. In this manner it is possible to channel water or other liquid at a relatively high pressure in conduit interior 6 in turbulent flow through the respective vortices 23 and from the vortex discharges 24 at a reduced pressure to minimize discharge rate variations caused by pressure fluctuations within the conduit interior 6.

It will be appreciated by those skilled in the art that a multiplicity of water flow paths of varying length and configuration can be provided in secondary conduit plate 8 to regulate the flow of water from the high pressure conduit interior 6 of primary conduit 2 through the inlet flow paths 16, baffle flow paths 17 and discharge flow paths 18, in order to provide a discharge water pressure which will result in a trickle or drip flow of desired magnitude, and one which is relatively insensitive to pressure fluctuations in the conduit interior 6. However, in a most preferred embodiment of the invention the secondary conduit plate 8 is created by first providing a resilient film or plate of selected thickness, such as 50 mils, and then inscribing the inlet cuts 12, discharge cuts 13 and the baffle cuts 14 as heretofore described, in order to create multiple inlet flowpaths 16, baffle flow paths 17 and discharge flow paths 18 of desired size and length, to facilitate the desired pressure drop and flow characteristics. It is further most preferred to sandwich or laminate the secondary conduit plate 8 between the top film edge 4 and bottom film edge 5 of a film 3 having thickness of about 6 mils, by way of example, in order to facilitate an easy and expendient construction of the drip irrigation hose 1. Since the displacement of the plate segments 20 in the manner described above results in inlet flow paths 16, baffle flow paths 17 and discharge flow paths 18 of desired magnitude and length, it is a simple expedient to attach the top film edge 4 and bottom film edge 5 of the film 3 to the selectively oriented plate segments 20, in order to create a drip irrigation hose 1 of high reliability.

A primary feature of the drip irrigation hose of this invention is the provision of a capability for creating, in a simple and inexpensive manner, flow paths of desired size and length in a secondary conduit 8, as well as the necessary pressure drop, to create a liquid discharge of desired proportions along the entire length of the primary conduit 2 and secondary conduit plate 8. Accordingly, in a most preferred embodiment of the invention where a "sawtooth" flow path is used to create the baffle flow paths 17 in secondary conduit plate 8, the number and configuration of the baffles 15 will depend upon the pressure in primary conduit 2 and a desired discharge of specified proportions. The location and spacing of the inlet flow paths 16 and the discharge flow paths 18 in the inside plate edge 10 and the outside plate edge 11, and in the bottom film edge 5 and top film edge 4, respectively, are chosen according to design parameters which depend upon the nominal liquid pressure in the primary conduit 2, and the length, number, size and configuration of the inlet flow paths 16, baffle flow paths 17 and discharge flow paths 18, as well as the desired discharge rate from each discharge flow path 18, to give a desired discharge per unit length of drip irrigation hose 1.

Although it is understood that liquids, including water and water with dissolved chemicals, including plant nutrients, pesticides and growth regulators, in non-exclusive particular, are commonly used in the drip irrigation hose of this invention, it is understood that other fluids such as gasses may also be uniformly applied with the drip irrigation hose 1.

Typical of the materials of construction which can be used to make the primary conduit 2 and secondary conduit plate 8 are polyvinylchloride (PVC), polyethylene (PE), acriloniril butadiene-styrene (ABS) and various paper materials, in non-exclusive particular.

Having described my invention with the particularity set forth above I claim:

1. A drip irrigation hose comprising a primary conduit characterized by an elongated, resilient sheet having a first sheet edge, and a second sheet edge lapped over said first sheet edge; an elongated, resilient plate extending between said first sheet edge and said second sheet edge of said resilient sheet and having a first plate edge in the interior of said conduit and a second plate edge outside said conduit; and at least one flow path in said plate, at least one inlet aperture in said first plate edge of said plate and communicating with said flow path, and at least one outlet aperture in said second plate edge and communicating with said flow path for discharging water from said primary conduit.

2. The drip irrigation hose of claim 1 wherein said at least one flow path is a continuous flow path extending in a zigzag pattern between said first plate edge and said second plate edge and further comprising a plurality of baffles defined by said zigzag pattern for regulating the fluid flow through said flow path.

3. The drip irrigation hose of claim 1 wherein said at least one inlet aperture is a plurality of inlet apertures in spaced relationship in said first plate edge and at least one outlet aperture is a plurality of outlet apertures in spaced relationship in said second plate edge.

4. The drip irrigation hose of claim 1 wherein:
(a) said at least one flow path is a continuous flowpath extending in a zigzag pattern between said first plate edge and said second plate edge, and further comprising a plurality of baffles defined by said zigzag pattern for regulating the flow through in said flow path; and
(b) said at least one inlet aperture is a plurality of inlet apertures in spaced relationship in said first plate edge and at least one aperture is a plurality of outlet apertures in spaced relationship in said second plate edge.

5. The drip irrigation hose of claim 1 wherein said at least one flow path is a plurality of discrete flow paths extending in zigzag pattern between said first plate edge and said second plate edge and further comprising a plurality of baffles defined by said zigzag pattern in each of said discrete flow paths for regulating the flow through said flow paths.

6. The drip irrigation hose of claim 5 wherein said at least one inlet aperture is a plurality of inlet apertures, said inlet apertures communicating with said plurality of discrete flow paths, respectively, and said at least one outlet aperture is a plurality of outlet apertures, said outlet apertures communicating with said plurality of discrete flow paths, respectively.

7. The drip irrigation hose of claim 1 wherein said at least one flow path is shaped by inscribing said flow path through the thickness of said plate making separate segments and separating and orienting said segments to define said flow path.

8. The drip irrigation hose of claim 1 wherein said at least one flow path is a plurality of discrete flow paths extending in a substantially straight line between said first plate edge and said second plate edge.

9. The drip irrigation hose of claim 8 wherein said at least one inlet aperture is a plurality of inlet apertures in spaced relationship in said first plate edge and communicating with said flow paths, respectively, and said at least one outlet aperture is a plurality of outlet apertures in spaced relationship in said second plate edge and communicating with said flow paths, respectively.

10. A drip irrigation hose comprising a primary conduit characterized by an elongated, resilient sheet having a first sheet edge, and a second sheet edge lapped over said first sheet edge; an elongated, resilient plate extending between said first sheet edge and said second sheet edge; and at least one flow path in said plate, at least one inlet aperture in said first sheet edge and communicating with said flow path, and at least one outlet aperture in said second sheet edge and communicating with said flow path, for discharging water from said primary conduit.

11. The drip irrigation hose of claim 10 wherein said at least one inlet aperture is a plurality of inlet apertures in spaced relationship in said first sheet edge and said at least one outlet aperture is a plurality of outlet aperatures in said second sheet edge.

12. The drip irrigation hose of claim 11 wherein said at least one flow path is a plurality of discrete flow paths extending in a zigzag pattern in said plate from said inlet apertures, respectfully, to said outlet apertures, respectfully.

13. A drip irrigation hose comprising a primary conduit characterized by an elongated, resilient sheet having a first sheet edge, and a second sheet edge lapped over said first sheet edge; an elongated, resilient plate extending between said first sheet edge and said second sheet edge and having a first plate edge in the interior of said conduit and a second plate edge outside of said conduit; at least one vortex chamber in said plate; at least one inlet aperture in said first plate edge of said plate and communicating with said vortex chamber, and at least one outlet aperture in said second sheet edge of said resilient sheet and communicating with substantially the center of said vortex chamber.

14. The drip irrigation hose of claim 13 wherein said at least one vortex chamber is a plurality of vortex chambers; said inlet aperture is a plurality of inlet apertures in spaced relationship in said first plate edge, and communicating with said vortex chambers, respectively, and said at least one outlet aperture is a plurality of apertures in spaced relationship in said second sheet edge, and communicating with substantially the centers of said vortex chambers, respectfully, for discharging water from said primary conduit.

* * * * *